United States Patent
Matyas

(10) Patent No.: US 7,423,856 B2
(45) Date of Patent: Sep. 9, 2008

(54) FAULT CONTROL CIRCUIT AND METHOD THEREFOR

(75) Inventor: Ladislav Matyas, Horni Becva (CZ)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 342 days.

(21) Appl. No.: 11/324,072

(22) Filed: Jan. 3, 2006

(65) Prior Publication Data

US 2007/0153439 A1    Jul. 5, 2007

(51) Int. Cl.
*H02H 7/00* (2006.01)

(52) U.S. Cl. ..................................... 361/90

(58) Field of Classification Search ............ 361/90
See application file for complete search history.

(56) References Cited

U.S. PATENT DOCUMENTS

2003/0231050 A1    12/2003  Sukup et al.
2007/0019343 A1*    1/2007  Barbehenn et al. ............ 361/18

OTHER PUBLICATIONS

Semiconductor Components Industries, LLC "Low-Standby High Performance PWM Controller" ON Semiconductor, Data Sheet: NCP1381/D Oct. 2005—Rev. 1.

* cited by examiner

*Primary Examiner*—Stephen W Jackson
(74) *Attorney, Agent, or Firm*—Robert P. Hightower

(57) ABSTRACT

In one embodiment, a fault control circuit of a switching power supply controller is configured to disable an operating voltage of the switching power supply controller responsively to a fault condition and to subsequently decouple the fault control circuit from another operating voltage.

20 Claims, 3 Drawing Sheets

FAULT CONTROL CIRCUIT AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form switching power supply controllers for use in power control systems. The previous power supply controllers generally received an input voltage and regulated and output voltage to a desired value within an acceptable range. In some cases, the power supply controllers included circuits to detect fault conditions such as the input voltage decreasing to a value that was insufficient for operating the systems receiving power from the power supply system. After detecting such a fault condition, the operation of the power supply controller was inhibited. In most embodiments, the control circuitry required to manage the power supply controller in response to the fault condition generally consumed power both during the fault condition and after the fault condition no longer existed. Additionally, the control circuitry generally required some analog elements and various digital logic elements such as gates, latches, etc. The digital and analog elements used area on the semiconductor die on which the power supply controller was produced thereby increasing the cost of the power supply controller.

Accordingly, it is desirable to have a fault control circuit of a power supply controller that reduces power dissipation both during and after a fault event occurs and that reduces the number of elements required to implement the fault control circuit.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
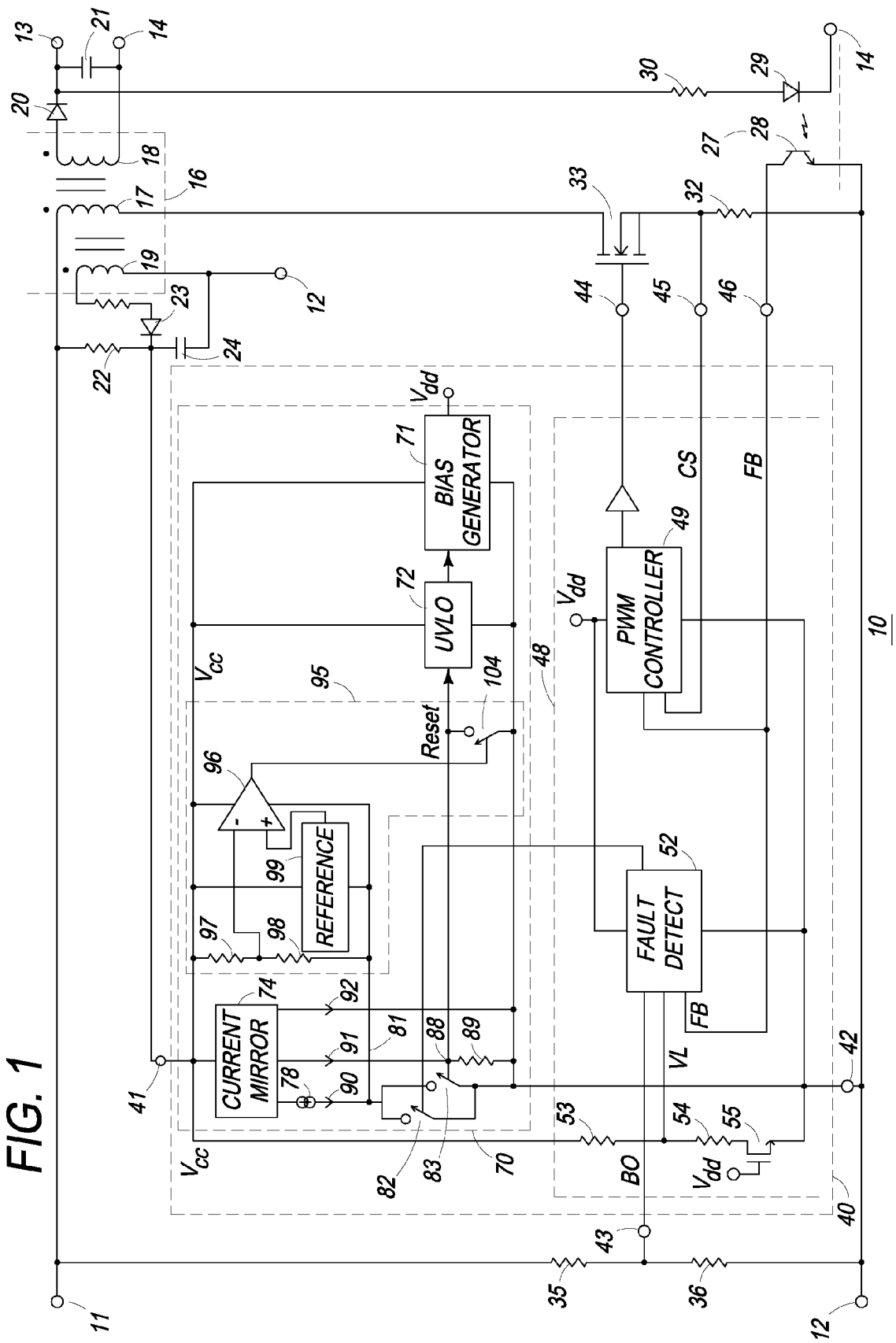
FIG. 1 schematically illustrates an embodiment of a portion of a power supply control system having a power supply controller in accordance with the present invention.

FIG. 1 schematically illustrates an embodiment of a portion of a power supply control system 10 that includes an exemplary embodiment of a portion of a power supply controller 40. Power supply controller 40 is configured to minimize the number of elements required to implement a first circuit or fault control circuit 70 of controller 40. Fault control circuit 70 is configured without any digital logic gates, and is configured to minimize the power consumption of controller 40. System 10 generally receives input power from a bulk input voltage that is applied between an input terminal 11 and a return terminal 12, and provides an output voltage between a voltage output 13 and a voltage return 14. Controller 40 is configured to regulate the value of the output voltage to a target value within a desired range of values. For example the target value may be five volts (5 V) and the desired range maybe plus or minus five percent (5%) of the target. System 10 usually includes a transformer 16 that includes a primary winding 17, a secondary winding 18, and an auxiliary winding 19. A rectifying diode 20 and a filter capacitor 21 may be connected to secondary winding 18 to assist in forming the output voltage. Auxiliary winding 19 generally is used to assist in forming an input voltage for controller 40 that can be used for operating at least a portion of controller 40. A capacitor 24, a resistor 22, and a diode 23 may be connected to auxiliary winding 19 to assist in forming the input voltage and providing power to controller 40 as will be seen further hereinafter. A power switch such as a power transistor 33 usually is connected to primary winding 17 in order to facilitate controller 40 regulating the value of the output voltage. A resistor 32 may be connected to transistor 33 in order to provide a current sense (CS) signal that is representative of the value of the current flowing through transistor 33. Although transistor 33 and resistor 32 are illustrated to be external to controller 40, in some embodiments one or both of transistor 33 and resistor 32 may be internal to controller 40. A feedback network that includes an optical coupler 27 and a resistor 30 can be used to provide a feedback (FB) signal to controller 40 that is representative of the value of the output voltage. Optical coupler 27 generally includes an optical emitter 29 and a photo-transistor 28. A resistor divider that includes a resistor 35 and a resistor 36 may be connected between terminals 11 and 12 to provide a voltage that is representative of the value of the bulk voltage received between terminals 11 and 12.

For the exemplary embodiment illustrated in FIG. 1, controller 40 is configured to receive the input voltage for operating controller 40 from a source external to controller 40 between a voltage input 41 and a voltage return 42. Controller 40 generally includes a brown-out (BO) input 43 that is used for sensing the value of the bulk voltage received between terminals 11 and 12, a PWM output 44, a current sense (CS) input 45, and a feedback (FB) input 46. Controller 40 generally includes fault control circuit 70 that is utilized to control the operation of controller 40 during fault conditions, and a switching or pulse width modulated (PWM) control section 48 that is utilized to control transistor 33 and regulate the value of the output voltage between output 13 and return 14. PWM control section 48 generally includes a fault detection block 52 and a PWM controller 49. PWM controller 49 can be any of a variety of different PWM controllers including a fixed frequency current mode PWM controller, a fixed frequency voltage mode PWM controller, a hysteretic controller, or other various types of PWM controllers that are well known to those skilled in the art. Controller 49 may include other well know PWM controller functions such as soft-start, leading edge blanking, skip-cycle, and over-voltage protection. Fault detection block 52 receives various status signals and forms a fault detect signal when a fault condition is detected.

Fault control circuit 70 is configured to receive the input voltage applied between input 41 and return 42 and use the input voltage as a first operating voltage for operating circuit 70. Circuit 70 is also configured to generate a second operating voltage (Vdd) that is used for operating other portions of controller 40 such as fault detection block 52 and PWM controller 49. Circuit 70 is also configured to disable supplying the second operating voltage (Vdd) responsively to receiving the fault detect signal from block 52 and to decouple circuit 70 from operating from the first operating voltage. Circuit 70 generally includes a pair of parallel connected switches 82 and 83 that assist in forming a reset control signal (Reset) that assists in the operation of circuit 70. Circuit 70 is also usually configured to include a current source 78, a current mirror 74, a resistor 89, and a reset circuit 95. Circuit 95 assists in resetting circuit 70 and decoupling circuit 70 from the first operating voltage. For the exemplary embodiment illustrated in FIG. 1, reset circuit 95 includes a comparator 96, a voltage reference or reference 99, and an operating voltage sensing circuit formed by a voltage divider of resistors 97 and 98 connected between input 41 and a switched voltage return 81 of circuit 70. One terminal of switches 82 and 83 is connected to return 42 and a second terminal is connected to switched voltage return 81 which also assists in decoupling circuit 70 from the first operating voltage. Comparator 96, reference 99, resistors 97 and 98, and current source 78, thus current mirror 74, are connected to receive operating power from the first operating supply voltage between input 41 and switched voltage return 81. As can be seen, when both of switches 82 and 83 are open, current source 78, comparator 96, resistors 97 and 98, and reference 99 are decoupled from switched voltage return 81, thus, from the first operating supply voltage and do not receive operating power. Circuit 70 may also include an under-voltage lock out (UVLO) circuit 72 and a bias generator 71 that is used to generate the second operating voltage (Vdd). UVLO circuit 72 and bias generator 71 are connected between input 41 and return 42 to receive the first operating voltage. UVLO circuit 72 monitors the value of the first operating voltage and prevents circuit 70 from generating the second operating voltage if the value of the first operating voltage is less than a minimum value that is required for operating controller 40 and preferably until the first operating voltage is greater than the minimum value. UVLO circuit 72 sends a control signal to bias generator 71 that allows bias generator 71 to generate the second operating voltage (Vdd). Note that UVLO circuit 72 and bias generator 71 may also be disabled by the reset control signal (Reset) of circuit 70. Thus, Reset can inhibit controller 40 from generating the second operating voltage.

In normal operation, the bulk voltage received between terminals 11 and 12 may be much greater than is needed to operate controller 40 and system 10. For example, the voltage applied between terminals 11 and 12 may be one hundred volts (100 V) or greater and the target value of the output voltage may be approximately five volts (5 V). During the initial start-up of system 10, capacitor 24 is discharged and the bulk voltage received between terminals 11 and 12 begins charging capacitor 24 through resistor 22. As capacitor 24 is charging, UVLO circuit 72 prevents controller 40 from generating the second operating voltage until the value of the input voltage on capacitor 24 is greater than the voltage required for operating controller 40. For example, the input voltage for operating controller 40 may be between ten and twelve volts (10-12 V) and UVLO circuit 72 may not allow controller 40 to begin operating until the input voltage reaches about fifteen volts (15V). In some embodiments, circuit 70 may also include a circuit, not shown, that detects the first operating voltage reaching a voltage that is no less than an upper limit of the desired range. For this example, the upper limit of the desired range could be greater than about twelve volts. Circuit 72 then enables bias generator 71 to generate the second operating voltage (Vdd) and subsequently PWM controller 49 begins operating to regulate the value of the output voltage. It should be noted that in some embodiments there may be an additional time delay between UVLO circuit 72 detecting a voltage that allows controller 40 to operate and generator 71 generating Vdd. Such a delay generally is used to ensure that the bias generator elements reach the desired value before operating the other elements of controller 40. As PWM controller 49 generates PWM drive pulses on output 44 to switch transistor 33, auxiliary winding 19 receives power and begins to charge capacitor 24 through diode 23. Thus, PWM controller 49 regulating the output voltage also regulates the voltage across capacitor 24, thus, the input voltage applied to input 41 of controller 40. The function of resistor 22, auxiliary winding 19, capacitor 24, and diode 23 to charge capacitor 24 and provide the input voltage is well known to those skilled in the art.

During the operation of controller 40, it is possible that a fault may occur. For example, the value of the bulk voltage between terminals 11 and 12 may begin to decrease due to a brown out or other low power condition on the mains circuit that supplies system 10. The low voltage condition is received by fault detect block 52 through resistors 35 and 36 on brown out (BO) input 43. Alternately, a short may occur between output 13 and return 14 and cause the feedback voltage to increase to its maximum level. In another instance, the input voltage to controller 40 may decrease. For example, the load supplied by system 10 may require a large increase in load current which may temporarily decreases the input voltage. A resistor divider of resistors 53 and 54 forms a low voltage (VL) signal that is representative of the value of the input voltage. As the input voltage decreases, VL also decreases. Note that a switch transistor 55 decouples resistors 53 and 54 when Vdd is disabled in order to reduce the power dissipation of controller 40 during a fault condition. Fault detect block 52 is configured to detect any of these conditions and generate a fault detect signal that is received by circuit 70. Asserting the fault detect signal closes switch 82 thereby connecting current source 78 and reset circuit 95 to switched voltage return 81 to receive power from the first operating voltage. With switch 82 closed, current source 78 supplies a current 90 that flows through a primary leg of current mirror 74 and through switch 82. Due to the current mirror function, current 90 causes current mirror 74 to generate a second current 91 through a second leg or mirror leg of current mirror 74. Current 91 flows through resistor 89 forming a voltage drop across resistor 89. The voltage drop across resistor 89 creates the reset control signal (Reset) at a reset node 88. The reset control signal enables switch 83 to close and current 90 divides to flow through both switches 82 and 83. The asserted reset control signal disables circuit 72 thereby disabling bias generator 71 and disables the second operating voltage. Disabling the second operating voltage removes operating power from PWM control section 48 thereby preventing the operation of section 48 including fault detection block 52. Disabling fault detection block 52 negates the fault detect control signal which in turn disables switch 82 to an open state. Because switch 83 is closed, current 90 continues to flow through current mirror 74, switch 83, and resistor 89 and also continues to assert Reset. Maintaining the asserted state of the Reset continues to prevent generating the second operating voltage.

In order to determine if the fault condition still exists, controller 40 is configured to periodically re-enable the second operating voltage. If the fault condition remains, the second operating voltage is once again disabled to prevent the operation of controller 49. In order to assist in providing this periodic enablement, current 90 flowing through the primary leg of current mirror 74 also generates a current 92 flowing through a third leg of current mirror 74. Since the second operating voltage is still inhibited or disabled, section 48 is not operating and is not switching transistor 33. As a result, capacitor 24 is not being charged from auxiliary winding 19. Current 92 flowing through the third leg of mirror 74 pulls charge from capacitor 24 thereby discharging capacitor 24 and decreasing the value of the first operating voltage. As the value of the first operating voltage decreases, the signal received on the inverting input of comparator 96 also decreases. When the value of the first operating voltage decreases to a first value or reset value the inverting input of comparator 96 becomes no greater than the reference voltage from reference 99 and the output of comparator 96 goes high to close switch 104. Closing switch 104 shorts out resistor 89 thereby negating the reset control signal on node 88. Negating Reset allows bias generator 71 to again generate the second operating voltage. Once the second operating voltage is established, PWM controller 49 begins switching transistor 33 to regulate the value of the output voltage and the value of the input voltage applied to controller 40. Additionally, negating Reset also opens switch 83. With switches 82 and 83 both open, reset circuit 95 and current source 78 are again decoupled from operating from the first operating supply voltage. Decoupling reset circuit 95 and current source 78 from switched voltage return 81 prevents the generation of currents 90-92 and prevents the operation of reset circuit 95 thereby reducing the power dissipation of controller 40. Using a current source and a current mirror along with switches 82 and 83 to implement the control of the second operating voltage and the control of circuit 70 minimizes the number of elements that are required to form of control circuit 70.

Figure 2:
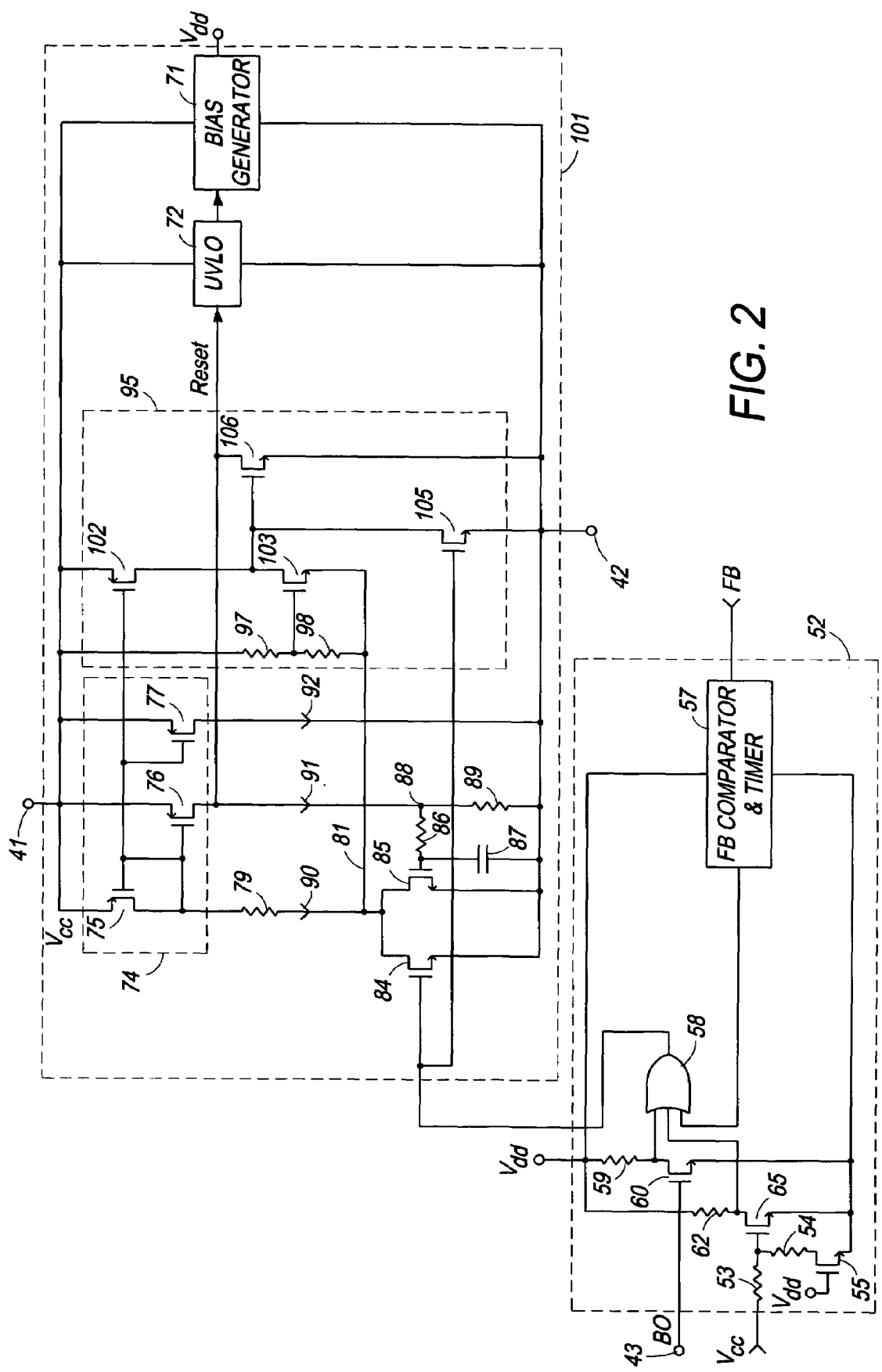
FIG. 2 schematically illustrates an exemplary alternate embodiment of a portion of the power supply controller of FIG. 1 in accordance with the present invention.

FIG. 2 schematically illustrates an exemplary alternate embodiment of a fault control circuit 101 that is an alternate embodiment of circuit 70 that was explained in the description of FIG. 1. Circuit 101 includes a first transistor 84 and a second transistor 85 that are configured to function as switches 82 and 83. A pinch resistor 79 operating in the current saturation mode is configured to function as current source 78. Examples of pinch resistors are disclosed in U.S. Pat. No. 6,605,978 issued to Halamik et al on Aug. 12, 2003 and also in U.S. patent publication No. 2003/0231050A by inventors Sukup et al that was published on Dec. 18, 2003 both of which are hereby incorporated herein by reference. Source 78 could be any of a variety of other types of current sources that are well known to those skilled in the art. A transistor 75 is connected in a current mirror configuration with transistors 76, 77, and 102. Transistor 75 functions as the primary leg of current mirror 74 while transistors 76 and 77 are configured to form the respective second and third legs of current mirror 74. A transistor 103 is used to implement comparator 96. The threshold voltage of transistor 103 along with the values of resistors 97 and 98 are selected to provide a threshold voltage that enables transistor 103 for the reset value of the first operating voltage. Transistor 102 provides bias current for transistor 103. A transistor 106 functions to implement switch 104. A transistor 105 disables transistor 106 to allow circuit 101 to generate a Reset signal if a fault detect signal is received from circuit 52. A resistor 86 and a capacitor 87 form a delay that ensures transistor 106 is disabled prior to circuit 101 generating the reset control signal. Resistor 86 and a capacitor 87 may also assist in preventing voltage spikes from enabling transistor 85.

An exemplary embodiment of fault detection block 52 is illustrated to include a transistor 60 and a resistor 59 that are configured as a comparator for the VL input signal. A transistor 65 and a resistor 62 are configured to form a comparator for the BO signal. The threshold voltage of transistors 60 and 65 along with the value of the respective resistors are selected to ensure that transistors 60 and 65 detect the desired values of the respective VL and BO signals. A comparator and timer 57 receive the feedback signal, compare the feedback signal to a reference voltage, and wait for a time-out after the feedback signal is at the maximum value to ensure that the FB signal is at that maximum value for a period of time before generating a feedback fault signal. An OR gate 58 receives the three fault signals and generates the fault detect signal for block 52. Those skilled in the art will appreciate that other well-known types of comparators may be used instead of transistors 60 and 65 and resistors 59 and 62.

In order to implement this functionality for the fault control circuit, a source of transistors 84 and 85 is connected to return 42. A drain of transistors 84 and 85 is commonly connected to switched voltage return 81, to a first terminal of pinch resistor 79, to a source of transistor 103, and to a first terminal of resistor 98. A gate of transistor 84 is connected to a gate of transistor 105 and to receive the fault detect signal from block 52. A gate of transistor 85 is commonly connected a first terminal of capacitor 87 and to a first terminal of resistor 86 which has a second terminal connected to node 88. A second terminal of capacitor 87 is connected to return 42. A first terminal of resistor 89 is connected to return 42 and a second terminal is connected to node 88. A second terminal of resistor 79 is commonly connected to a drain and a gate of transistor 75, a gate of transistor 76, a gate of transistor 77, and a gate of transistor 102. A source of transistor 75 is commonly connected to input 41, a source of transistor 76, a source of transistor 77, a source of transistor 102, and a first terminal of resistor 97. A drain of transistor 76 is connected to node 88 and a reset control input of Circuit 72. A drain of transistor 77 is connected to return 42. A drain of transistor 102 is commonly connected to a gate of transistor 106, a drain of transistor 105, and a drain of transistor 103. A gate of transistor 103 is connected to a second terminal of resistors 97 and 98. A source of transistors 105 and 106 is connected to return 42.

Figure 3:
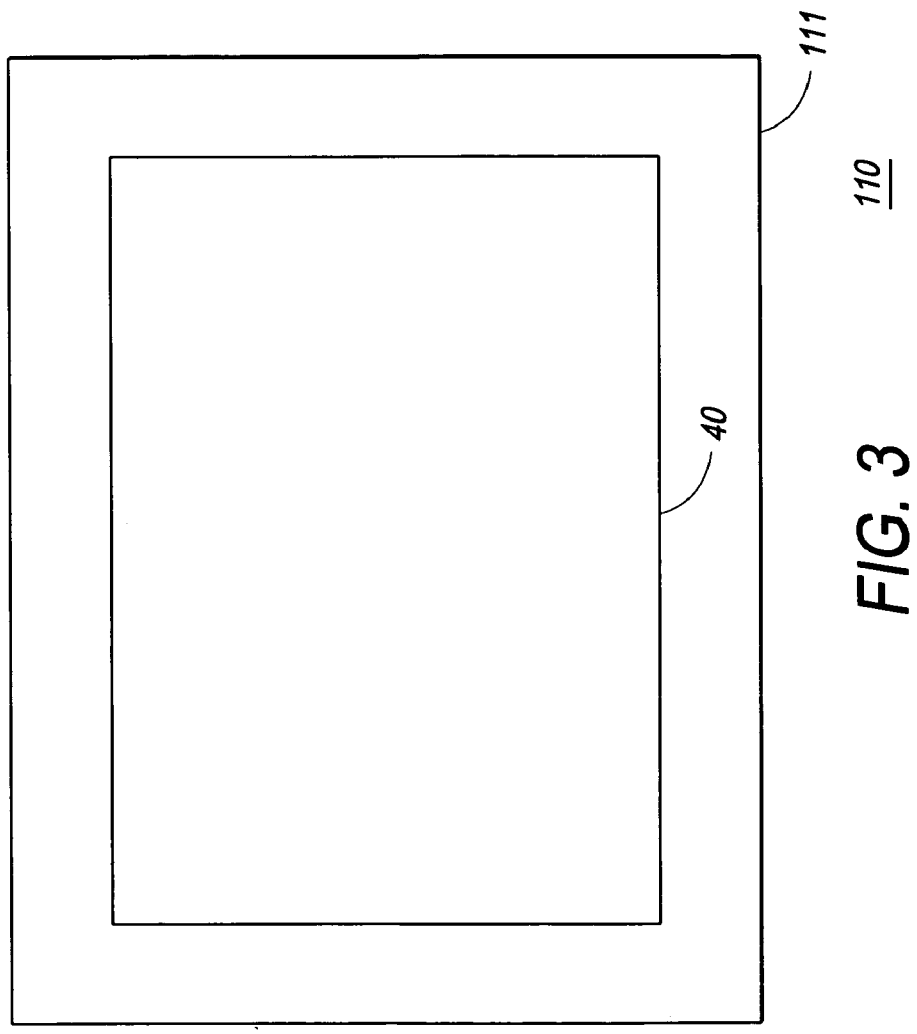
FIG. 3 illustrates an enlarged plan view of a semiconductor device that includes the power controller of FIG. 1 in accordance with the present invention.

FIG. 3 schematically illustrates an enlarged plan view of a portion of an embodiment of a semiconductor device or integrated circuit 110 that is formed on a semiconductor die 111. Controller 40 is formed on die 111. Die 111 may also include other circuits that are not shown in FIG. 3 for simplicity of the drawing. Controller 40 and device or integrated circuit 110 are formed on die 111 by semiconductor manufacturing techniques that are well known to those skilled in the art.

In view of all of the above, it is evident that a novel device and method is disclosed. Included, among other features, is forming a device that uses fewer elements to implement a fault control circuit and that does not use digital logic elements. Using a current source, a current mirror, and parallel connected switches, such as switches 82 and 83 or transistors 84 and 85, minimizes the active elements of the fault control circuit, reduces the costs, and facilitates reducing the power dissipation.

While the subject matter of the invention is described with specific preferred embodiments, it is evident that many alternatives and variations will be apparent to those skilled in the semiconductor arts. More specifically the subject matter of the invention has been described for a particular P-channel and N-channel transistors, although the method is directly applicable to bipolar transistors, as well as, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A switching power supply controller comprising:
   a first input configured to receive a first voltage from a voltage source external to the switching power supply controller;
   a first portion of the switching power supply controller operably coupled to detect a fault condition;
   a first circuit of the switching power supply controller configured to operably couple the first circuit to use the first voltage to form a first operating voltage for operating the first circuit responsively to the switching power supply controller detecting the fault condition and operably coupled to assert a control signal responsively to the switching power supply controller detecting the fault condition, the first circuit operably coupled to negate the control signal responsively to the first operating voltage decreasing to a first value and to decouple the first circuit from operating from the first operating voltage responsively to the negated state of the control signal;
   the first circuit configured to generate a second operating voltage for operating a second portion of the switching power supply controller wherein the second operating voltage is different from the first operating voltage, the first circuit configured to disable the second operating voltage responsively to asserting the control signal; and
   a PWM control circuit of the switching power supply controller configured to use the second operating voltage to operate the PWM control circuit.

2. The switching power supply controller of claim 1 further including the first circuit coupled to reduce a value of the first voltage.

3. The switching power supply controller of claim 1 wherein the first circuit is configured to couple the first circuit to operate from the first operating voltage responsively to the first portion detecting the fault condition.

4. The switching power supply controller of claim 1 wherein the first circuit includes a current source coupled to supply a first current, a first transistor coupled to conduct the first current responsively to the first portion detecting the fault condition and a second transistor coupled to conduct the first current responsively to the control signal.

5. The switching power supply controller of claim 1 wherein the first circuit includes a current mirror having a primary path coupled to conduct a first current and a second path coupled to conduct a second current that is mirrored from the first current wherein the second current is used to form the control signal.

6. The switching power supply controller of claim 5 further including the current mirror having a third path coupled to conduct a third current that is mirrored from the first current wherein the third current is used to decrease a value of the first voltage.

7. The switching power supply controller of claim 6 wherein the primary path includes a first transistor coupled to conduct the first current, a second transistor coupled in a mirrored configuration with the first transistor to form the second current, and a third transistor coupled in the mirrored configuration with the first and second transistors to form the third current.

8. The switching power supply controller of claim 7 wherein the first transistor includes a first current carrying electrode coupled to receive the first operating voltage, a second current carrying electrode coupled to a first terminal of a current source, and a control electrode; the second transistor includes a first current carrying electrode coupled to receive the first operating voltage, a control electrode coupled to the control electrode and the second current carrying electrode of the first transistor, and a second current carrying electrode coupled to supply the second current; and the third transistor includes a first current carrying electrode coupled to receive the first operating voltage, a control electrode coupled to the control electrode of the first transistor, and a second current carrying electrode coupled to supply the third current.

9. The switching power supply controller of claim 8 further including a fourth transistor having a first current carrying electrode coupled to a second terminal of the current source, a second current carrying electrode coupled to a voltage return, and a control electrode coupled to be enabled by the first portion of the switching power supply controller detecting the fault condition; a fifth transistor having a first current carrying electrode coupled to the first current carrying electrode of the fourth transistor, a second current carrying electrode coupled to the second current carrying electrode of the fourth transistor; and a control electrode coupled to receive the control signal.

10. The switching power supply controller of claim 9 wherein the first current carrying electrode of the fourth transistor forms a switched voltage return and wherein the first circuit is coupled to the switched voltage return to receive the first operating voltage.

11. The switching power supply controller of claim 5 wherein the first circuit includes a reset transistor and a comparator, the comparator coupled to detect the first voltage decreasing to the first value and responsively enable the reset transistor to negate the control signal.

12. The switching power supply controller of claim 1 wherein the first portion of the switching power supply controller is coupled to operate from the second operating voltage.

13. The switching power supply controller of claim 12 wherein the first portion is coupled to assert a fault detect signal responsively to detecting the fault condition and to negate the fault detect signal responsively to the switching power supply controller disabling the second operating voltage.

14. A method of forming a switching power supply controller comprising:
   configuring a first circuit of the switching power supply controller to operate from a first operating voltage that is derived from a voltage source that is external to the switching power supply controller;
   configuring the switching power supply controller to generate a second operating voltage and selectively couple the second operating voltage to be used as an operating voltage for a second circuit of the switching power supply controller, wherein the second operating voltage is different from the first operating voltage;
   configuring the switching power supply controller to detect a fault condition;
   configuring the first circuit to assert a control signal responsively to the switching power supply controller detecting the fault condition, to negate the control signal responsively to the voltage source decreasing to a first value, and to decouple the first circuit from operating from the first operating voltage; and configuring the switching power supply controller to disable the second operating voltage responsively to the control signal.

15. The method of claim 14 wherein configuring the first circuit to assert the control signal responsively to the switching power supply controller detecting the fault condition includes configuring the first circuit to generate a first current responsively to detecting the fault condition and form a second current responsively to the first current wherein the second current is used to form the control signal.

16. The method of claim 15 wherein configuring the first circuit to generate the first current includes coupling a current source to form the first current to flow through a current mirror and through a series coupled first switch responsively to the switching power supply controller detecting the fault condition, coupling the current mirror to generate the second current responsively to the first current, and configuring the first circuit to steer the second current through a second switch coupled in parallel with the first switch responsively to the control signal.

17. The method of claim 16 wherein coupling the current source to form the first current to flow through the current mirror and through the series coupled first switch responsively to the switching power supply controller detecting the fault condition includes configuring the first circuit to disable the first switch from conducting the first current responsively to the voltage source decreasing to the first value.

18. The method of claim 14 further including configuring the first circuit to decrease a value of the voltage source responsively to the switching power supply controller detecting the fault condition.

19. The method of claim 14 wherein configuring the first circuit to assert the control signal includes coupling a comparator of the first circuit to receive a signal that is representative of the voltage source.

20. A switching power supply controller comprising:

a first input configured to receive a first voltage from a voltage source external to the switching power supply controller;

a first portion of the switching power supply controller operably coupled to detect a fault condition;

a first circuit of the switching power supply controller operably coupled to use the first voltage to form a first operating voltage for operating the first circuit and coupled to assert a control signal responsively to the switching power supply controller detecting the fault condition, the first circuit operably coupled to negate the control signal responsively to the first operating voltage decreasing to a first value and to decouple the first circuit from operating from the first operating voltage; and the switching power supply controller configured to generate a second operating voltage for operating a second portion of the switching power supply controller wherein the second operating voltage is different from the first operating voltage, the switching power supply controller configured to disable the second operating voltage responsively to the control signal.

* * * * *